Feb. 21, 1967     L. G. CALDWELL     3,305,142
AERATING APPARATUS
Filed May 21, 1965                                  2 Sheets-Sheet 1
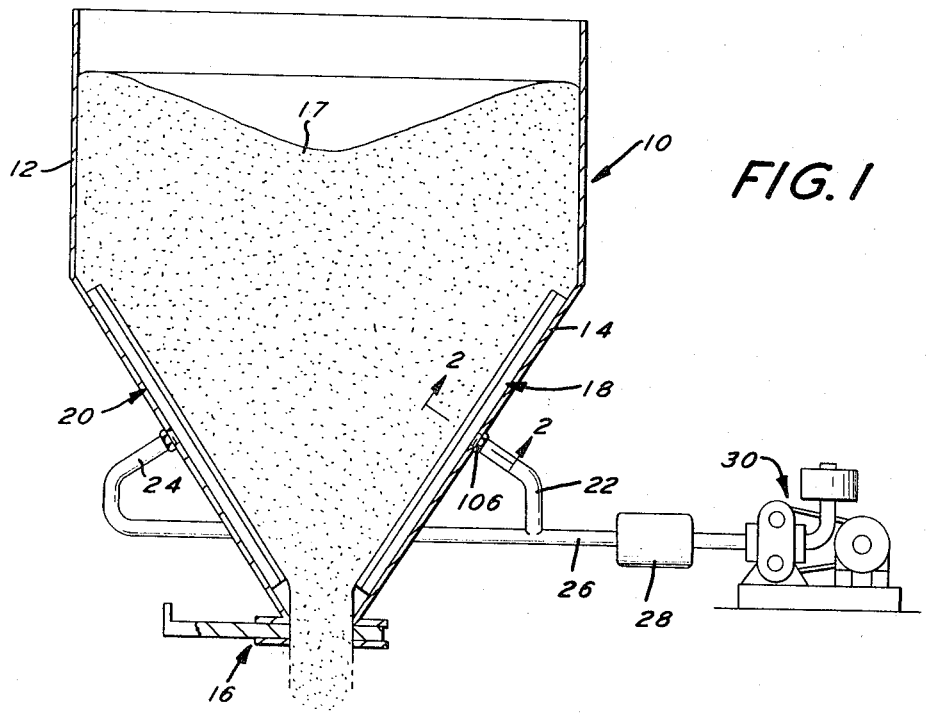
FIG. 1
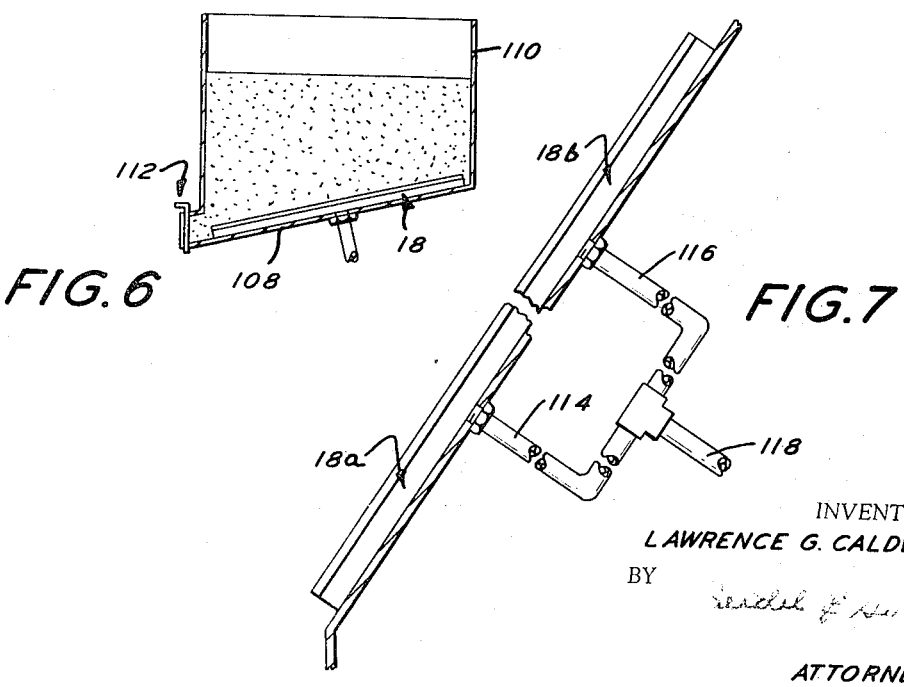
FIG. 6                   FIG. 7
INVENTOR.
LAWRENCE G. CALDWELL
BY
ATTORNEYS.

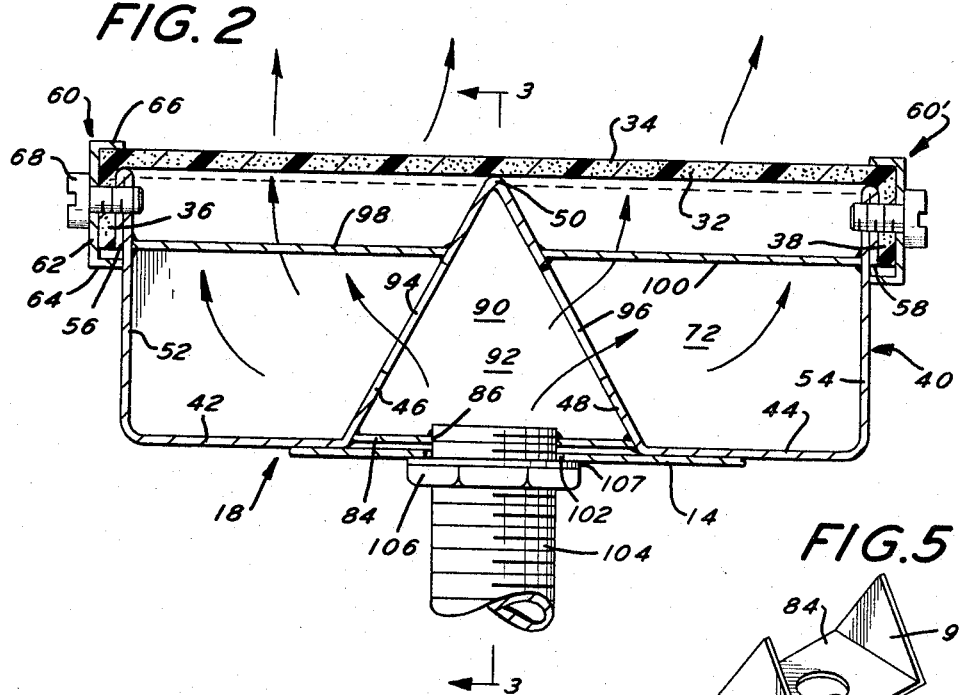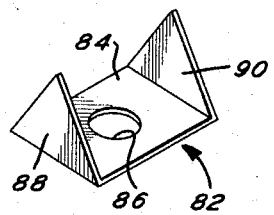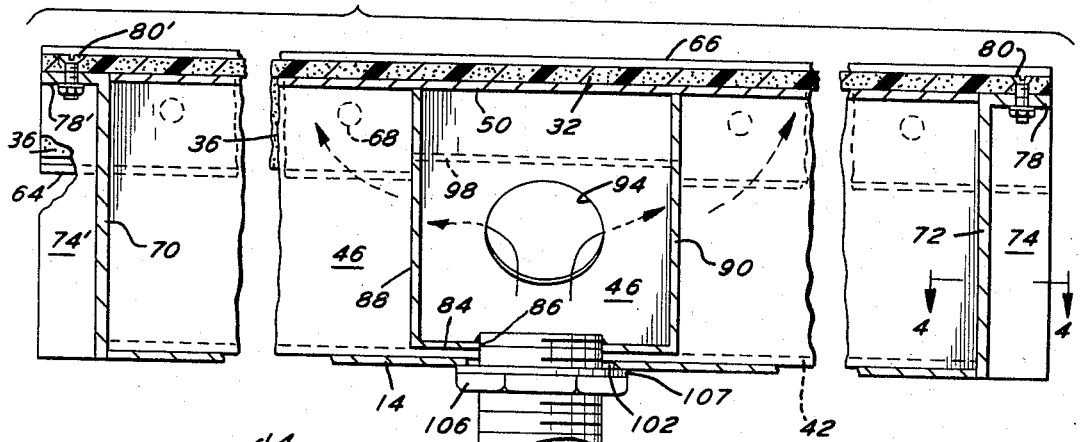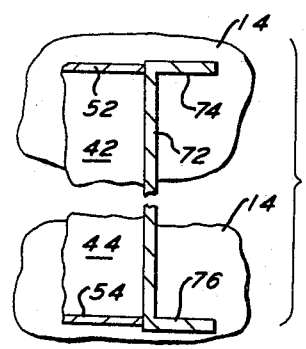
INVENTOR.
LAWRENCE G. CALDWELL
BY Seidel & Gonda
ATTORNEYS.

United States Patent Office 3,305,142
Patented Feb. 21, 1967

3,305,142
AERATING APPARATUS
Lawrence G. Caldwell, Glen Head, Nassau County, N.Y., assignor to The Ducon Company, Inc., Mineola, N.Y., a corporation of New York
Filed May 21, 1965, Ser. No. 457,709
6 Claims. (Cl. 222—195)

This invention relates to an aerating appartus, and more particularly, to an aerating apparatus for fluidizing pulverant material within an enclosure to promote flow of the material within the enclosure.

The aerating apparatus of the present invention is not in and of itself a conveyor. Instead, the aerating apparatus of the present invention fluidizes pulverant material so that it may flow due to gravity within an enclosure having an inclined wall. Heretofore, various aerating devices have been proposed which suggest the utilization of a variety of materials for the porous member. The use of porous filter stones as a porous medium has been widely proposed heretofore. The substitution of a fabric supported by a screen grid is suggested by Patent 2,665,035.

The aerating apparatus of the present invention includes an aerating device adapted to be mounted within an enclosure. The aerating device is preferably structurally interrelated in a manner so as to provide a fluidizing surface which is rigid, seamless, sanitary, and chemically inert. The fluidizing surface is preferably a layer of polymeric material sufficiently permeable to gases such as air. A housing is coupled to peripheral portions of the polymeric material and a conduit is provided for introducing a gas into the housing for discharge through the polymeric material. Preferably, a baffle means is provided in the housing to prevent delivery of gas from the conduit directly toward the plane of said polymeric material.

The aerating device of the present invention does not utilize materials subject to rotting such as fabric. Also, no ceramics are used which could result in silica contamination of the pulverant material. No caulking is utilized which could contaminate the pulverant material or dry out and require maintenance. Also, the aerating device is structurally interrelated in a manner whereby it is sufficiently strong and sealed at the place of manufacture so that it may withstand any of the pressure heads conventionally associated with available equipment utilizing pulverant material.

It is an object of the present invention to provide a novel aerating apparatus.

It is another object of the present invention to provide an aerating device adapted to be disposed within an enclosure containing pulverant material for aerating the pulverant material.

It is another object of the present invention to provide an aerating device which is rigid and has a fluidizing surface which is seamless, sanitary, chemically inert and permeable to gases.

It is another object of the present invention to provide an aerating device which is structurally interrelated in a manner so as not to include materials which are susceptible to rotting or drying out and utilizes materials which will not cause silica contamination of the pulverant material to be aerated.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a sectional view through an aerating apparatus of the present invention.

FIGURE 2 is a sectional view taken along the line 2—2 in FIGURE 1.

FIGURE 3 is a sectional view taken along the line 3—3 in FIGURE 2.

FIGURE 4 is a sectional view taken along the line 4—4 in FIGURE 3.

FIGURE 5 is a perspective view of the plenum housing component.

FIGURE 6 is a sectional view through an aerating apparatus in accordance with another embodiment of the present invention.

FIGURE 7 is a sectional view illustrating an alternative embodiment wherein a plurality of aerating devices may be coupled together.

Referring to the drawing in detail, wherein like numerals indicate like elements, there is shown in FIGURE 1 an elevation view, partly in section, of aerating apparatus in accordance with the present invention designated generally as 10.

The aerating apparatus 10 includes an enclosure illustrated in FIGURE 1 as having a cylindrical portion 12 and a tapered section 14 terminating at a valve means 16. When the valve means 16 is in its open disposition as illustrated, pulverant material 17 discharges from the enclosure by gravity. As is typical with most pulverant materials, they tend to bridge, arch or hang up. A pair of aerating devices 18 and 20 are provided within the enclosure to fluidize the pulverant material and thereby reduce or eliminate arching, bridging, or hang up of the pulverant material 17.

The aerating device 18 is connected to a branch conduit 22. Aerating device 20 is connected to a branch conduit 24. The conduits 22 and 24 are connected to a main conduit 26 having a filter 28 therein. A motorized blower 30 is provided of conventional construction and coupled to the conduit 26.

While only two aerating devices are illustrated in FIGURE 1 within the enclosure, it will be appreciated that the particular circumstances of the enclosure and the pulverant material may require one or more aerating devices. The aerating devices 18 and 20 are identical. Hence, only the aerating device 18 will be described in detail.

As shown more clearly in FIGURE 2, the aerating device 18 includes a gas permeable polymeric resin material 32 having a fluidizing surface 34. Material 32 is rigid, seamless, sanitary, chemically inert, and completely smooth. I prefer to use a gas permeable polyethylene for the material 32. Other polymeric materials such as polyvinyl chloride, Teflon, etc. may be used if desired.

The fluidizing surface 34 is on the base portion of the material 32. Material 32 is provided with downwardly extending flanges 36 and 38 along its side edges. A housing designated generally as 40 is coupled to the periphery of the material 32. Housing 40 is preferably constructed so as to have spaced bottom wall portions 42 and 44 interconnected along their adjacent edges by sloped wall portions 46 and 48. Portions 46 and 48 are joined at an apex 50 immediately adjacent to the inner surface of material 32 substantially equidistant from the flanges 36 and 38.

The remaining side edges of the bottom wall portions 42 and 44 are provided with upstanding side wall portions 52 and 54, respectively. The housing 40 is preferably made from sheet metal such as commercially available carbon steel or from a non-corrosive metal such as stainless steel 304. The upper edges of the side walls 52 and 54 are bent so as to be provided with overlapping flanges 56 and 58, respectively.

The transverse distance across the flanges 56 and 58 is equal to the distance between the flanges 36 and 38.

A pair of channel-shaped securing members 60 and 60' are utilized to couple the flanges 36 and 38 of the material 32 to the housing 40. Each of the members 60 and 60' are identical. The member 60 will be described in detail.

Member 60 includes a base 62 having spaced parallel flanges 64 and 66. Flanges 64 and 66 have a length corresponding generally to the combined thickness of the flanges 36 and 56. Holes are punched, drilled or otherwise provided in the base 62 at spaced points therealong. Corresponding tapped holes are provided in the side wall 52 at spaced points therealong in a portion thereof overlapped by the flange 56. A bolt 68 is threaded to the wall 52 and extends through the base 62, flange 36, flange 56. Thus, it will be seen that the coupling between the peripheral side portion of the material 32 envelopes the flange 36 with flange 66 overlying the portion of the upper surface of material 32. In this manner, an airtight joint is provided.

As shown more clearly in FIGURE 3, the device 18 is provided with end walls 70 and 72. The end walls 70 and 72 are identical. Hence, only end wall 72 will be described in detail with corresponding primed numerals provided on the end wall 70. End wall 72 is a generally rectangular plate having perpendicular flanges 74, 76 and 78 extending from three of its four peripheral edges. Holes are drilled or punched in the overlapping portions of the flange 78 and the juxtaposed end portion of the material 32. Screws 80 having nuts are provided to join the flange 78 to the juxtaposed end portion of the material 32. All surfaces of the housing 40 which are in contact with the material 32 are preferably provided with a sealing compound.

As will be apparent from FIGURES 3 and 4, the material 32 is longer than the side walls 52 and 54 by a distance corresponding to the height of the flanges 74, 76 and 78 from their base 72. The side flanges 74 and 76 form an extension of the side walls 52 and 54, respectively. Hence, it will be noted that the end walls and the flanges are made from a heavier gauge material.

As shown more clearly in FIGURE 5, a plenum chamber element 82 is provided. Element 82 includes a base 84 having an aperture 86 centrally located therein and upstanding triangular end walls 88 and 90. The end walls 88 and 90 are preferably equilateral triangles having a height so as to cooperate with the sloped walls 46 and 48 and thereby define a plenum chamber 92.

The plenum chamber element 82 is preferably continuous welded in position as shown more clearly in FIGURE 3. An aperture 94 is provided in the sloped wall portion 46 between the end walls 88 and 90. Similarly, an aperture 96 is provided in the sloped wall portion 48.

A baffle plate 98 is secured between the wall portion 52 and the wall portion 46 substantially below the apex 50. A corresponding baffle plate 100 is secured between the wall portions 48 and 54. The plates 98 and 100 are in substantially the same plane corresponding generally to the plane of the lowermost edge of the flanges 56 and 58. The baffle plates 98 and 100 have a width corresponding generally to the transverse dimension between the end walls 88 and 90 on the plenum chamber element 82. Hence, the baffle plates 98 and 100 cooperate with the sloped wall portions 48 and 46 to provide a baffle means in the housing to prevent delivery of gas directly toward the plane of the material 32. As a result thereof, the incoming gas must follow the path of the arrows illustrated and thereby distribute itself along the two separate distribution chambers within the housing 40, such distribution chambers being on opposite sides of the apex 50, with the apex 50 providing additional support for the material 32 along its central portion to prevent flexing of material 32 as a result of the weight or pressure head of the pulverant material 17.

The wall 14 is provided with an aperture 102. A nipple 104 having exterior threads is welded or otherwise secured to the base 84 and extends into the aperture 86. The O.D. of the nipple 104 is less than the diameter of the aperture 102. A lock nut 106 is threaded to the outer periphery of nipple 104 and is the sole means for coupling the aerating device 18 to the wall 14. An elastic washer 107 is placed between lock nut 106 and wall 14 to provide an air-tight and dust-tight seal. The end of nipple 104 remote from aperture 86 is adapted to be threadedly coupled to the branch conduit 22. Aperture 86 is centrally located with respect to the plenum chamber 92, and the chamber 92 in turn is centrally located with respect to the end walls 70 and 72.

As above indicated, the material 32 is gas permeable. When using fluidizing grade Vyon material 32 which is ⅛ inch thick, material 32 would have a gas permeability which would permit 6 cubic feet per minute of gas per square foot to flow through the material 32 with a pressure head of 8 inches of water. The air discharge through the material 32 fluidizes the pulverant material 17 adjacent thereto to prevent arching, bridging, and the like whereby the material 17 may continuously flow out of the enclosure due to gravity when the valve means 16 is open.

In FIGURE 6, there is illustrated another embodiment of the aerating apparatus of the present invention wherein the aerating devices 18 may be disposed side by side along a flat bottom wall 108 of an enclosure 110. The wall 108 is tilted toward a valved discharge chute 112.

In FIGURE 7, there is illustrated a pair of aerating devices 18a and 18b each of which are identical with the aerating device 18. The aerating devices 18a and 18b are aligned with one another and may be interconnected so that they communicate with one another if desired by appropriately eliminating the juxtaposed end walls or by providing a communicating conduit through the juxtaposed end walls. The devices 18a and 18b are preferably independent units joined together by clips not shown. The gas conduit 114 which delivers gas to the plenum chamber of aerating device 18a and the conduit 116 which delivers gas to the plenum chamber of the aerating device 18b may each communicate with a main conduit 118. In this manner, the individual aerating devices may be made in short standard lengths of 2½ feet, 5 feet and 10 feet. Combinations of these various lengths may be utilized with the aerating devices interconnected end to end or joined by clips as shown in FIGURE 7 where the enclosure requires the same.

When the aerating device includes a gas permeable polyethylene for the material 32, the maximum operating temperature for the aerating device is 200° F. If the operating temperatures require, a suitable polymeric material capable of withstanding higher temperatures may be utilized. Likewise, the permeability of the material 32 may be varied as dictated by the nature of the pulverant material 17. In each of the embodiments described above, conduit means is provided for introducing a gas such as air into the housing at a point substantially equidistant from the ends of the housing, with a baffle means in the housing to prevent delivery of the air from the conduit directly toward the plane of the polymeric material.

As will be apparent from the above description, the aerating device of the present invention is an integrated unit capable of being fabricated at the factory for installation in existing enclosures as well as for use in new enclosures. For installation in existing enclosures, all that is required in the way of modifying existing equipment is to provide the aperture 102 in a wall of the enclosure.

The present invention may be embodied in other specific forms without departing from the spirit or essential attributes thereof and, accordingly, reference should be made to the appended claims, rather than to the foregoing specification as indicating the scope of the invention.

It is claimed:

1. An aerating device for use in an enclosure for aerating pulverant material within the enclosure comprising a layer of rigid, seamless, chemically inert, polymeric material having a smooth fluidizing surface, said material being permeable to gases, a trough-like housing substantially coextensive in size with said polymeric material and coupled to peripheral portions of said material, conduit means for introducing a gas into said housing at a location substantially equidistant from the ends of said housing, baffle means in said housing to prevent delivery of gas from said conduit directly toward the plane of said polymeric material, a generally triangular shaped plenum chamber substantially equidistant from the ends of said housing, the base of said chamber being substantially parallel to the plane of said polymeric material, said base being coupled to a threaded nipple, said housing having a chamber having its top defined by said polymeric material, and means providing communication between said last-mentioned chamber and said plenum chamber.

2. An aerating device in accordance with claim 1 wherein at least a portion of said baffle means is disposed between said polymeric material and said communication means, said baffle means being connected to a wall of said plenum chamber disposed between said polymeric material and said communication means.

3. An aerating device in accordance with claim 1 wherein said housing is coupled to longitudinally extending sides of said polymeric material by longitudinally extending securing members, said sides of said polymeric material having flanges embraced by said securing members.

4. An aerating device in accordance with claim 1 including means in said housing supporting a longitudinally extending central portion of said polymeric material.

5. An aerating device in accordance with claim 1 including end walls on said housing, means coupling the end of said polymeric material to said end walls, longitudinally extending side flanges on said polymeric material, and said flanges being connected to said housing by bolt members extending through said flanges and a portion of said housing.

6. An aerating device in accordance with claim 1 wherein said polymeric material is provided with side flanges substantially perpendicular to said fluidizing surface, said flanges being coupled to said housing by channel-shaped members, side walls of said housing being between said flanges on said polymeric material, said channel-shaped members embracing outer peripheral surfaces of said flanges, whereby said flanges are between the channel-shaped members and side walls of said housing, with bolt-like members extending through the channel-shaped members, said flanges, and side walls of said housing.

References Cited by the Examiner
UNITED STATES PATENTS

| | | | |
|---|---|---|---|
| 2,628,188 | 2/1953 | Kirkbride et al. | 302—53 X |
| 2,665,035 | 1/1954 | Schemm | 302—29 X |
| 2,883,240 | 4/1959 | Hahl et al. | 302—29 |
| 2,919,160 | 12/1959 | Blackburn | 302—29 |
| 3,202,461 | 8/1965 | Paton | 302—52 |
| 3,226,166 | 12/1965 | Gertolini et al. | 302—52 |
| 3,236,422 | 2/1966 | Bailey et al. | 302—53 |

ROBERT B. REEVES, *Primary Examiner.*

STANLEY H. TOLLBERG, M. HENSON WOOD, Jr.,
*Examiners.*